(12) United States Patent
Tomita et al.

(10) Patent No.: US 9,038,384 B2
(45) Date of Patent: May 26, 2015

(54) CONTROL APPARATUS FOR INTERNAL COMBUSTION ENGINE EQUIPPED WITH SUPERCHARGER

(75) Inventors: Tetsuji Tomita, Susono (JP); Taku Ibuki, Gotenba (JP); Yoshihisa Hirosawa, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 81 days.

(21) Appl. No.: 13/390,277

(22) PCT Filed: Oct. 26, 2009

(86) PCT No.: PCT/JP2009/068731
§ 371 (c)(1),
(2), (4) Date: Feb. 13, 2012

(87) PCT Pub. No.: WO2011/052086
PCT Pub. Date: May 5, 2011

(65) Prior Publication Data
US 2012/0204556 A1   Aug. 16, 2012

(51) Int. Cl.
*F02D 23/02*    (2006.01)
*F02D 23/00*    (2006.01)
(Continued)

(52) U.S. Cl.
CPC .............. *F02D 23/00* (2013.01); *F02B 37/007* (2013.01); *F02B 37/013* (2013.01);
(Continued)

(58) Field of Classification Search
CPC ... F02D 23/00; F02D 41/182; F02D 41/0007; F02D 2250/21; F02D 2200/0406; F02B 37/004; F02B 37/18; F02B 37/007; F02B 37/013; F02B 37/127; Y02T 10/42; Y02T 10/144

USPC ........... 60/602, 612, 601; 123/562, 299, 300, 123/305
See application file for complete search history.

(56) References Cited

U.S. PATENT DOCUMENTS 6,134,888 A * 10/2000 Zimmer et al. ................. 60/600
6,311,493 B1 * 11/2001 Kurihara et al. ............... 60/600
(Continued)

FOREIGN PATENT DOCUMENTS

JP    U-06-18663    3/1994
JP    A-07-217476    8/1995
(Continued)

OTHER PUBLICATIONS

Mar. 9, 2010 International Search Report issued in International Patent Application No. PCT/JP2009/068731 (with translation).

*Primary Examiner* — Kenneth Bomberg
*Assistant Examiner* — Jason T Newton
(74) *Attorney, Agent, or Firm* — Oliff PLC

(57) ABSTRACT

A first supercharger and a second supercharger are disposed in series in intake and exhaust passages. In a B region in which both the supercharging effects of the first and second superchargers are utilized, the opening of an exhaust control valve disposed in a passage for bypassing the turbine of the first supercharger is set to an intermediate degree, and the opening of an intake control valve disposed in a passage for bypassing the compressor of the first supercharger is set to the minimum. In a C region in which the supercharging effect of only the second supercharger is utilized, both the openings of the exhaust control valve and the intake control valve are set to the maximum. When the control region shifts from B region to C region as result of acceleration of the vehicle, the fuel injection amount is reduced over a predetermined period immediately after the shift.

12 Claims, 12 Drawing Sheets

(51) Int. Cl.
  *F02B 37/007*    (2006.01)
  *F02B 37/013*    (2006.01)
  *F02B 37/12*     (2006.01)
  *F02B 37/18*     (2006.01)
  *F02D 41/00*     (2006.01)
  *F02B 37/00*     (2006.01)
  *F02D 41/18*     (2006.01)

(52) U.S. Cl.
  CPC .............. *F02B 37/127* (2013.01); *F02B 37/18* (2013.01); *F02D 41/0007* (2013.01); *Y02T 10/144* (2013.01); *Y02T 10/42* (2013.01); *F02B 37/004* (2013.01); *F02D 41/182* (2013.01); *F02D 2200/0406* (2013.01); *F02D 2250/21* (2013.01)

(56) References Cited

U.S. PATENT DOCUMENTS

| | | | |
|---|---|---|---|
| 6,801,846 B1* | 10/2004 | Rodriguez et al. | 701/102 |
| 6,863,058 B2* | 3/2005 | Kurtz et al. | 123/672 |
| 2007/0119415 A1* | 5/2007 | Lewis et al. | 123/295 |
| 2007/0151243 A1* | 7/2007 | Stewart | 60/612 |
| 2007/0295007 A1* | 12/2007 | McNulty et al. | 60/602 |
| 2008/0053088 A1* | 3/2008 | Yanakiev | 60/602 |
| 2008/0148727 A1* | 6/2008 | de Ojeda | 60/602 |
| 2009/0100834 A1* | 4/2009 | Sexton | 60/602 |
| 2011/0016862 A1* | 1/2011 | Song et al. | 60/602 |
| 2011/0036086 A1* | 2/2011 | Liu et al. | 60/602 |

FOREIGN PATENT DOCUMENTS

| | | |
|---|---|---|
| JP | A-2005-146906 | 6/2005 |
| JP | A-2007-263033 | 10/2007 |
| JP | A-2008-128129 | 6/2008 |
| JP | A-2008-274802 | 11/2008 |
| JP | A-2009-97362 | 5/2009 |
| JP | A-2009-108693 | 5/2009 |
| JP | A-2009-191667 | 8/2009 |
| JP | A-2010-190070 | 9/2010 |

* cited by examiner

FIG.3

|  | Vhe | Vhi | Vle | Nh |
|---|---|---|---|---|
| A REGION | CLOSED | CLOSED | CLOSED | INTERMEDIATE |
| B REGION | INTERMEDIATE | ↑ | ↑ | ↑ |
| C REGION | OPEN | OPEN | ↑ | ARBITRARY |
| D REGION | ↑ | ↑ | OPEN | ↑ |

FIG.11

|  | Vhe | Vhi | Vle | Vli |
|---|---|---|---|---|
| A REGION | CLOSED | CLOSED | OPEN | OPEN |
| B REGION | INTERMEDIATE | ↑ | INTERMEDIATE | CLOSED |
| C REGION | OPEN | OPEN | CLOSED | ↑ |
| D REGION | ↑ | ↑ | OPEN | ↑ |

CONTROL APPARATUS FOR INTERNAL COMBUSTION ENGINE EQUIPPED WITH SUPERCHARGER

TECHNICAL FIELD

The present invention relates to a control apparatus for an internal combustion engine equipped with a supercharger (turbo charger) driven by the energy of exhaust gas discharged from the internal combustion engine.

BACKGROUND ART

Conventionally, there has been widely known a control apparatus for an internal combustion engine equipped with a supercharger in which two turbo chargers are serially disposed in exhaust and intake passages (series-type 2-stage supercharger) (see, for example, Japanese Patent Application Laid-Open (kokai) No. 2007-263033). Specifically, the apparatus disclosed in this document includes a first turbo charger, and a second turbo charger which is greater in size than the first turbo charger. The first turbo charger includes a first turbine disposed in the exhaust passage and driven by the energy of exhaust gas; and a first compressor disposed in the intake passage and driven by the first turbine. The second turbo charger includes a second turbine which is disposed in the exhaust passage at a position downstream of the first turbine, is driven by the energy of exhaust gas, and is greater in size (capacity and outer diameter) than the first turbine; and a second compressor which is disposed in the intake passage at a position upstream of the first compressor, is driven by the second turbine, and is greater in size (capacity and outer diameter) than the first compressor.

The apparatus disclosed in the above-mentioned document includes a first exhaust bypass passage which establishes a bypass between a portion of the exhaust passage located upstream of the first turbine and a portion of the exhaust passage located between the first and second turbines; and a first intake bypass passage which establishes a bypass between a portion of the intake passage located between the first and second compressors and a portion of the intake passage located downstream of the first compressor. A first exhaust control valve for adjusting the minimum opening sectional area of the first exhaust bypass passage (first exhaust bypass area) is disposed in the first exhaust bypass passage. A first intake control valve for adjusting the minimum opening sectional area of the first intake bypass passage (first intake bypass area) is disposed in the first intake bypass passage.

SUMMARY OF THE INVENTION

Incidentally, in the apparatus disclosed in the above-mentioned document, in general, three control regions are set for combinations of intake air flow rate and supercharging pressure ratio as shown in FIG. 12; i.e., a region in which the supercharging effect of only the first turbo charger is utilized (first turbo use region), a region in which the supercharging effects of both the first and second turbo chargers are utilized (two turbos use region), and a region in which the supercharging effect of only the second turbo charger is utilized (second turbo use region). The supercharging pressure ratio refers to the ratio of the pressure in the intake passage at a position located downstream of the first compressor to the pressure in the intake passage at a position located upstream of the second compressor. The intake air flow rate refers to the flow rate of air passing through the intake passage (the amount of air per unit time).

Curves L1 and L2 shown in FIG. 12 are lines drawn on the basis of so-called surge and choke lines of the first and second turbo chargers, respectively. The region surrounded by the line L1 shows a region in which the first turbo charger exhibits a supercharging effect (a range in which the first turbo charger can be used). The region surrounded by the line L2 shows a region in which the second turbo charger exhibits a supercharging effect (a range in which the second turbo charger can be used). The first turbo use region corresponds to a portion of the region surrounded by the curve L1 located on one side of a curve S1 where the intake air flow rate assumes a smaller value as compared with the other side, and the two turbos use region corresponds to a portion of the region surrounded by the curve L1 located on the other side of the curve S1 where the intake air flow rate assumes a larger value as compared with the one side. The second turbo use region corresponds to a portion of the region surrounded by the curve L2 located on one side of the curve L1 where the intake air flow rate assumes a larger value as compared with the other side.

In the first turbo use region, the first exhaust bypass area is set to its minimum value (e.g., zero), and the first intake bypass area is set to its minimum value (e.g., zero). That is, all exhaust gas passes through the first turbine, and all intake gas passes through the first compressor. Thus, by the energy of all the exhaust gas passing through the first turbine, the first turbine is rotatively driven, and the first compressor is rotatively driven, whereby the first turbo charger exhibits a supercharging effect. Meanwhile, all the exhaust gas flowing into the second turbine has already passed through the first turbine. When exhaust gas passes through the first turbine, the energy of that exhaust gas is consumed as a result of drive of the first turbine. Accordingly, the exhaust gas flowing into the second turbine has a considerably decreased energy. Therefore, the second turbine (accordingly, the second compressor) is not rotatively driven at all, or is not rotatively driven sufficiently, whereby the second turbo charger exhibits no supercharging effect. As described above, in the first turbo use region, there can be obtained a state in which the first turbine rotates and the second turbine does not rotate at all or does not rotate sufficiently, whereby only the first turbo charger exhibits a supercharging effect.

In the two turbos use region, whereas the first intake bypass area is set to its minimum value (e.g., zero) as in the case of the first turbo use region, the first exhaust bypass area is adjusted to an intermediate value between the minimum value and the maximum value thereof. That is, whereas all intake gas passes through the first compressor, a portion of exhaust gas passes through the first turbine, and the remaining exhaust gas flows directly into the second turbine without passing through the first turbine (while passing through the first exhaust bypass passage). Thus, the first turbine (accordingly, the first compressor) is rotatively driven by the energy of a "portion of the exhaust gas" passing through the first turbine, whereby the first turbo charger exhibits a supercharging effect. Meanwhile, the "remaining exhaust gas" flows into the second turbine without consuming its energy for drive of the first turbine. Accordingly, the exhaust gas flowing into the second turbine has a relatively large energy. Therefore, the second turbine (accordingly, the second compressor) is rotatively driven, whereby the second turbo charger exhibits a supercharging effect. As described above, in the two turbos use region, there is obtained a state in which both the first and second turbines rotate, whereby both the first and second turbo chargers exhibit their supercharging effects.

In the second turbo use region, the first exhaust bypass area is set to its maximum value, and the first intake bypass area is set to its maximum value. That is, all (almost all) exhaust gas flows directly into the second turbine without passing through the first turbine (while passing through the first exhaust bypass passage), and no (almost no) intake gas flows through the first compressor (all (almost all) intake gas passes through the first intake bypass passage). Thus, the first turbine (accordingly, the first compressor) is not rotatively driven at all or is not rotatively driven to a sufficient degree, whereby the first turbo charger exhibits no supercharging effect. Meanwhile, all (almost all) exhaust gas flows into the second turbine without consuming its energy for drive of the first turbine. Accordingly, the energy of the exhaust gas flowing into the second turbine is sufficiently large. Therefore, the second turbine (accordingly, the second compressor) is rotatively driven, whereby the second turbo charger exhibits a supercharging effect. As described above, in the second turbo use region, there is obtained a state in which the first turbine does not rotate at all or does not rotate sufficiently, and the second turbine rotates, whereby only the second turbo charger exhibits a supercharging effect.

Incidentally, the intake air flow rate strongly depends on the operation speed of the internal combustion engine, and increases (decreases) as the operation speed increases (decreases) (see FIG. 8 which will be described later). Accordingly, in a process in which a vehicle which includes the above-described internal combustion engine equipped with a supercharger is accelerating, the intake air flow rate increases as a result of an increase in the operation speed. This process corresponds to a shift of the control region from the first turbo use region to the two turbos use region, and then to the second turbo use region in FIG. 12.

Here, there is assumed a case where, as a result of acceleration of the vehicle in a state in which the combination of the intake air flow rate and the supercharging pressure ratio (control region) falls within the two turbos use region, the control region shifts from the two turbos use region to the second turbo use region (see the shift from point A to point B in FIG. 12).

In this case, in association with the shift of the control region from the two turbos use region to the second turbo use region, the first exhaust bypass area is immediately switched from an intermediate value to the maximum value, and the first intake bypass area is immediately switched from the minimum value to the maximum value. As a result of this switching of the first exhaust bypass area from the intermediate value to the maximum value, the exhaust resistance decreases immediately and sharply. Thus, the exhaust pressure as measured at a position upstream of the first turbine (hereinafter, may be simply referred to as the "exhaust pressure") also decreases immediately and sharply. As a result, immediately after the switching, there arises a phenomenon in which, due to an increase in combustion efficiency, etc., the output torque of the internal combustion engine increases momentarily (see Δn FIG. 9, which will be described later).

Also, the rotational speed of the first turbine (accordingly, the first compressor)—whose rotative drive is stopped as a result of the switching of the first exhaust bypass area from the intermediate value to the maximum value and the switching of the first intake bypass area from the minimum value to the maximum value—is maintained at a sufficient high level (at which the first turbine can exhibit a sufficient supercharging effect) over a short period of time in accordance with the inertias of the first turbine and the first compressor, and then decreases relatively slowly. Accordingly, the supercharged pressure (the pressure of intake gas flowing into a combustion chamber) also decreases relatively slowly from a point slightly delayed from the switching. As a result, there occurs a phenomenon in which the output torque of the internal combustion engine decreases relatively slowly from a point slightly delayed from the switching (accordingly, the momentary increase in the output torque) (see ΔG2 in FIG. 9, which will be described later).

As described above, when the control region shifts from the two turbos use region to the second turbo use region as a result of acceleration of the vehicle, immediately after the shift, the output torque of the internal combustion engine increases momentarily because of a sharp drop in the exhaust pressure, and the output torque then decreases relatively slowly because of a decrease in the supercharging pressure. Accordingly, a passenger of the vehicle on which such an internal combustion engine is mounted may feel, as a relatively large torque step, a series of phenomena in which the output torque increases and decreases.

In the case where only the "decrease in the output torque attributable to a decrease the supercharging pressure" occurs (that is, a "momentary increase in the output torque attributable to a sharp drop in the exhaust pressure" does not occur), the above-mentioned torque step can be minimized by means of greatly depressing an accelerator pedal by a driver of the vehicle after the shift of the control region. However, in actuality, since the momentary increase in the output torque occurs before the output torque decreases, the driver has great difficulty in reducing the above-mentioned torque step through operation of the accelerator pedal.

In view of the above, desire has arisen to restrain occurrence of the "momentary increase in the output torque attributable to a sharp drop in the exhaust pressure." However, this increase in the output torque is momentary. Accordingly, it is extremely difficult to restrain the momentary increase in the output torque through employment of feedback control of fuel injection amount performed on the basis of the detected value of the output torque. The above-described problem occurs not only in the above-described series-type 2-stage supercharger, but also in a supercharger in which two turbo chargers are disposed in the exhaust passage and the intake passage such that they are connected in parallel to each other (parallel-type 2-stage supercharger).

The present invention has been accomplished in order to solve the above-described problem, and its object is to provide a control apparatus for an internal combustion engine equipped with a supercharger which can properly restrain occurrence of a "momentary increase in the output torque of the internal combustion engine stemming from a sharp drop in the exhaust pressure," which increase occurs at the time of shifting from a two turbos use region to a second turbo use region as a result of acceleration of the vehicle.

The control apparatus according to the present invention is applied not only to a series-type 2-stage supercharger but also to a parallel-type 2-stage supercharger. First, there will be described the case where the control apparatus according to the present invention is applied to a series-type 2-stage supercharger.

In this case, the mechanical configuration of the control apparatus according to the present invention is identical with that of the above-described control apparatus. In the control apparatus according to the present invention, determination means determines whether the combination of supercharging pressure ratio and intake air flow rate (that is, control region) falls within a two turbos use region or a second turbo use region (a region adjacently located on one side of the two turbos use region where the intake air flow rate assumes a larger value as compared with the opposite side). In this case, the determination means may be configured to also determine whether or not an operation state falls within a first turbo use region (a region adjacently located on the other side of the two turbos use region where the intake air flow rate assumes a smaller value as compared with the opposite side).

In the control apparatus according to the present invention, control means operates in the same manner as in the above-described control apparatus. Specifically, when the control region is determined to fall within the two turbos use region, the first exhaust bypass area is adjusted to an intermediate value between the minimum value and the maximum value thereof, and the first intake bypass area is set to the minimum value thereof (control for the two turbos use region). In the case where the control region is determined to fall within the second turbo use region, the first exhaust bypass area is set to the maximum value thereof, and the first intake bypass area is set to the maximum value thereof (control for the second turbo use region). Also, in the case where the control region is determined to fall within the first turbo use region, the first exhaust bypass area is set to the minimum value thereof, and the first intake bypass area is set to the minimum value thereof (control for the first turbo use region). Each of the minimum value of the first exhaust bypass area and the minimum value of the first intake bypass area is, for example, zero or a very small value near zero.

A control apparatus according to an embodiment of the present invention includes a fuel injection means for injecting fuel in an amount determined on the basis of an operation state of the internal combustion engine performs, over a pre-determined period, amount reducing control which reduces the injection amount of the fuel (in a feed-forward manner), when the control region shifts from the two turbos use region to the second turbo use region. That is, the fuel injection means is configured such that, in an ordinary state (a state in which the amount reducing control is not performed), the fuel injection means injects fuel in a base fuel injection amount determined on the basis of the operation state of the internal combustion engine, and, during the amount reducing control, the fuel injection means injects fuel in an amount smaller than the base fuel injection amount. The above-described amount reducing control may be started at the point in time when the control region shifts from the two turbos use region to the second turbo use region, or at the time of switching of the first exhaust bypass area and the first intake bypass area performed in association with the shifting of the control region (a point in time when such switching is instructed or a point in time when such switching is completed).

By virtue of this configuration, in the case where the control region shifts from the two turbos use region to the second turbo use region as a result of acceleration of the vehicle, the amount reducing control is started immediately after the shift, whereby the output torque decreases due to a decrease in the injection amount. By virtue of this decrease in the output torque, it becomes possible to restrain the "momentary increase in the output torque stemming from a sharp drop in the exhaust pressure," which occurs immediately after the shift of the control region. That is, the above-mentioned torque step (torque step which a passenger of the vehicle may feel) can be reduced by an amount corresponding to the decrease in the output torque caused by the decrease in the injection amount. In addition, a driver of the vehicle can minimize the above-mentioned torque step relatively easily by greatly depressing an accelerator pedal after the shift of the control region.

In the control apparatus according to the present invention, preferably, a reduction amount of the fuel injection amount (from the base fuel injection amount) in the amount reducing control is determined on the basis of the operation speed of the internal combustion engine and the fuel injection amount.

The amount of a drop in the exhaust pressure caused by the switching of the first exhaust bypass area from the intermediate value to the maximum value in association with the shift of the control region from the two turbos use region to the second turbo use region has a strong correlation with the combination of the operation speed of the internal combustion engine and the injection amount. In addition, the greater the drop amount of the exhaust pressure, the greater the degree of the "momentary increase in the output torque stemming from a sharp drop in the exhaust pressure." Accordingly, the "momentary increase in the output torque stemming from a sharp drop in the exhaust pressure" also has a strong correlation with the combination of the operation speed of the internal combustion engine and the injection amount. According to the above-described configuration, the reduction amount of fuel during the amount reducing control can be determined in accordance with the degree of the "momentary increase in the output torque stemming from a sharp drop in the exhaust pressure" (which occurs when the amount reducing control is not performed). Accordingly, the "momentary increase in the output torque stemming from a sharp drop in the exhaust pressure" can be stably minimized irrespective of the operation state of the internal combustion engine (the combination of the operation speed and the injection amount).

Notably, the above-configuration can also be described as a configuration in which the amount of a drop in the exhaust pressure caused by the switching of the first exhaust bypass area is determined on the basis of the operation speed of the internal combustion engine and the fuel injection amount, and the reduction amount of the fuel injection amount (from the base fuel injection amount) in the amount reducing control is determined on the basis of the determined exhaust pressure drop amount.

Preferably, the control apparatus according to the present invention is configured such that, when the control region shifts from the two turbos use region to the second turbo use region, the determination as to whether or not the amount reducing control is to be performed is made on the basis of the operation speed of the internal combustion engine and the fuel injection amount. When the amount reducing control is determined to be executed, the amount reducing control is executed, and, when the amount reducing control is determined not to be executed, the amount reducing control is not executed.

In the case where the amount of a drop in the exhaust pressure caused by the switching of the first exhaust bypass area is sufficiently small, the degree of the "momentary increase in the output torque stemming from a sharp drop in the exhaust pressure" is also sufficiently small. Accordingly, the necessity of the amount reducing control is very low. In accordance with the above-described configuration, there can be restrained occurrence of a situation where the amount reducing control is executed unnecessarily despite the necessity of the amount reducing control being very low.

Preferably, the control apparatus according to the present invention is configured to start the amount reducing control when the control region has shifted from the two turbos use region to the second turbo use region, and end the amount reducing control when the pressure of intake gas flowing into a combustion chamber of the internal combustion engine (supercharged pressure) is determined to have started to decrease.

As described above, the "drop in the output torque caused by a decrease in the supercharged pressure" starts from a point in time slightly delayed from the shift of the control region from the two turbos use region to the second turbo use region. Meanwhile, a sharp drop in the exhaust pressure (accordingly, the momentary increase in the output torque) ends at a point near a point at which the decrease of the superchrged pressure starts. Accordingly, the above-described configuration enables setting the end time of the amount reducing control to a proper time (=a time near the time when the sharp drop in the exhaust pressure ends). Furthermore, by virtue of this configuration, an exhaust pressure sensor for detecting the end of the sharp drop in the exhaust pressure becomes unnecessary.

The control apparatus according to the present invention may include a second exhaust bypass passage which establishes a bypass between a portion of the exhaust passage located between the first and second turbines and a portion of the exhaust passage located downstream of the second turbine; and a second exhaust control valve disposed in the second exhaust bypass passage and adapted to adjust the minimum opening sectional area of the second exhaust bypass passage (second exhaust bypass area). In this case, the second exhaust bypass area is usually set to its minimum value (e.g., zero). Meanwhile, only in the case where the operation state falls within a subregion (bypass region) of the second turbo use region located on the side where the intake air flow rate assumes a larger value, the second exhaust bypass area can be set to its maximum value.

By virtue of this configuration, in an operation region in which the operation speed is high, a portion of exhaust gas passes through the second exhaust bypass passage, whereby an increase in the flow rate of exhaust gas flowing into the second turbine can be restrained. As a result, it is possible to restrain generation of an excessive supercharging effect, which would otherwise be generated as a result of an increase in the operation speed.

In the above, the case where the control apparatus according to the present invention is applied to a series-type 2-stage supercharger has been described. The above-described matters themselves (and matters equivalent to the above-described matters) can be similarly applied to the case where the control apparatus according to the present invention is applied to a parallel-type 2-stage supercharger.

BRIEF DESCRIPTION OF THE DRAWINGS

FIG. 3 is a table showing the details of supercharge control for each control region executed by the apparatus shown in FIG. 1.

FIG. 11 is a table showing the details of supercharge control for each control region executed by the apparatus shown in FIG. 10.

BEST MODE FOR CARRYING OUT THE INVENTION

Embodiments of a control apparatus for a supercharger-equipped internal combustion engine according to the present invention will now be described with reference to the drawings.

First Embodiment

Figure 1:
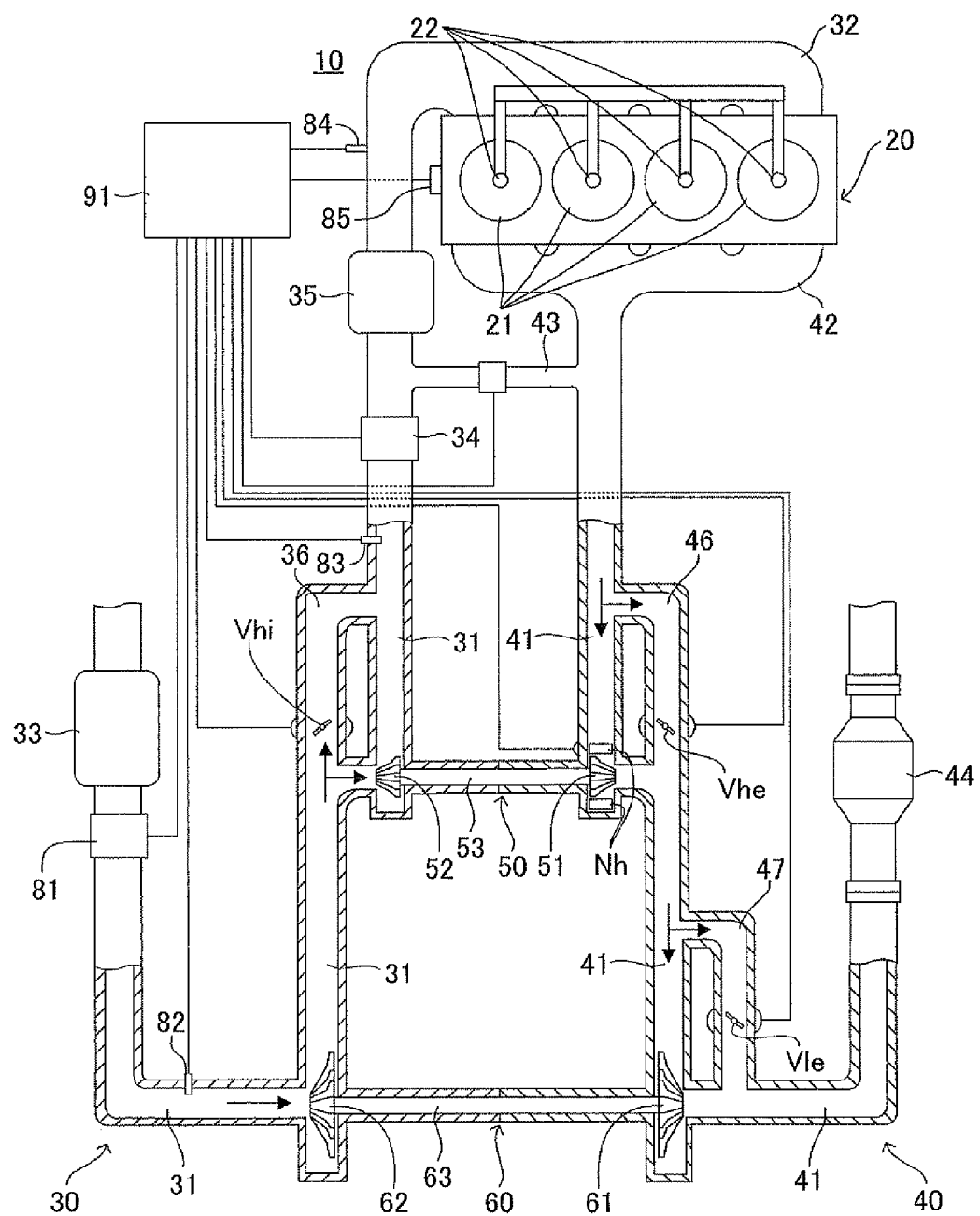
FIG. 1 is a schematic diagram showing the entirety of a system in which a control apparatus according to a first embodiment of the present invention is applied to an internal combustion engine equipped with a series-type 2-stage supercharger.

FIG. 1 schematically shows the configuration of a control apparatus 10 for an internal combustion engine equipped with a series-type 2-stage supercharger according to a first embodiment of the present invention. This control apparatus 10 includes an engine (diesel engine) main body 20, an intake system 30, an exhaust system 40, a first turbo charger 50, and a second turbo charger 60.

Four cylinders 21 are disposed in the engine main body 20 such that they are arranged in series. Each cylinder 21 has an in-cylinder injection valve 22 which is disposed at an upper portion thereof and adapted to inject fuel into the cylinder 21. Each in-cylinder injection valve 22 injects fuel into the corresponding cylinder 21 in a later half of the compression stroke (near the compression top dead center), whereby diesel combustion is achieved.

The intake system 30 includes an intake passage 31, and an intake manifold 32 communicating with the intake passage 31. An air cleaner 33, a throttle valve 34, and an inter cooler 35 are disposed in the intake passage 31 in this sequence from the upstream end toward the downstream end. Air is supplied to the engine main body 20 via the intake system 30.

The exhaust system 40 includes an exhaust passage 41, and an exhaust manifold 42 communicating with the exhaust passage 41. An EGR gas passage 43 and a catalyst 44 are provided in the exhaust system 40. The EGR gas passage 43 establishes communication between a portion of the exhaust passage 41 located upstream of the first turbine 51 and a portion of the intake passage 31 located downstream of the throttle valve 34. An EGR control valve is disposed in the EGR gas passage 43. The catalyst 44 is a so-called $NO_x$ occlusion catalyst. Exhaust gas from the engine main body 20 is discharged to the outside via the exhaust system 40.

The first turbo charger 50 includes a first turbine 51 and a first compressor 52. The first turbine 51 and the first compressor 52 are coaxially connected together via a turbine shaft 53 for unitary rotation. The first turbine 51 is disposed in the exhaust passage 41, and is rotatively driven by the energy of exhaust gas. The first compressor 52 is disposed in the intake passage 31, and is rotatively driven by the first turbine 51.

Also, the first turbo charger 50 includes a plurality of nozzles Nh provided around the first turbine 51. The first turbo charger 50 can change the total area of the openings of the nozzles Nh through which exhaust gas flows toward the first turbine 51 (first exhaust inflow area). The nozzles Nh can be said to be a "mechanism which can change the characteristic of the first turbo charger 50 in terms of the relation between the energy of exhaust gas input thereto and the rotation energy of the first turbine 51 output therefrom." The nozzles Nh are driven by an unillustrated actuator.

The second turbo charger 60 includes a second turbine 61 and a second compressor 62. The second turbine 61 and the second compressor 62 are coaxially connected together via a turbine shaft 63 for unitary rotation. The second turbine 61 is disposed in the exhaust passage 41 at a location downstream of the first turbine 51, and is rotatively driven by the energy of exhaust gas. The second compressor 62 is disposed in the intake passage 31 at a location upstream of the first compressor 52, and is rotatively driven by the second turbine 61.

The second turbine 61 is greater in outer diameter than the first turbine 51. That is, the second turbine 61 has a size (capacity) greater than that of the first turbine 51. Similarly, the second compressor 62 is greater in outer diameter than the first compressor 52. That is, the second compressor 62 has a size (capacity) greater than that of the first compressor 52.

The intake system 30 includes a first intake bypass passage 36. The first intake bypass passage 36 establishes a bypass between a portion of the intake passage 31 located between the first compressor 52 and the throttle valve 34, and a portion of the intake passage 31 located between the first and second compressors 52 and 62. A control valve Vhi is disposed in the first intake bypass passage 36. The control valve Vhi adjusts the minimum opening sectional area of the first intake bypass passage 36 (first intake bypass area). The control valve Vhi is driven by an unillustrated actuator.

The exhaust system 40 includes a first exhaust bypass passage 46 and a second exhaust bypass passage 47. The first exhaust bypass passage 46 establishes a bypass between a portion of the exhaust passage 41 located upstream of the first turbine 51, and a portion of the exhaust passage 41 located between the first and second turbines 51 and 61. The second exhaust bypass passage 47 establishes a bypass between the portion of the exhaust passage 41 located between the first and second turbines 51 and 61, and a portion of the exhaust passage 41 located between the second turbine 61 and the catalyst 44.

Control valves Vhe and Vle are disposed in the first and second exhaust bypass passages 46 and 47, respectively. The control valves Vhe and Vle control the minimum opening sectional areas of the first and second exhaust bypass passages 46 and 47 (first and second exhaust bypass areas), respectively. Each of the control valves Vhe and Vle is driven by an unillustrated actuator.

Meanwhile, the control apparatus 10 includes a hot-wire air flow meter 81, pressure sensors 82 to 84, and a rotational speed sensor 85. The air flow meter 81 detects the air flow rate (intake air flow rate) Ga (mass flow rate; mass per unit time) of intake air flowing through a portion of the intake passage 31 located upstream of the second compressor 62. The pressure sensor 82 detects the pressure within the intake passage 31 at a position upstream of the second compressor 62. The pressure sensor 83 detects the pressure within the intake passage 31 at a position between the first compressor 52 and the throttle valve 34. The pressure sensor 84 detects the pressure within the intake passage 31 at a position downstream of the throttle valve 34 (and the inter cooler 35) (the pressure within the intake manifold; hereinafter also referred to as the "superchrged pressure Pim"). The rotational speed sensor 85 detects the rotational speed (engine rotational speed) NE of the crankshaft (not shown) of the engine.

Moreover, the control apparatus 10 includes an ECU (electric control apparatus) 91 composed of a CPU, etc. The ECU 91 is electrically connected to the sensors 81 to 85. The ECU 91 supplies to the CPU signals from the sensors 81 to 85, and sends drive signals to the actuator of the nozzle Nh, the actuators of the control valves Vhi, Vhe, and Vle, etc. in accordance with instructions from the CPU.

(Supercharge Control)

Next, with reference to FIGS. 2 to 7, there will be described supercharge control; i.e., control of the control valves Vhi, Vhe, Vle and the nozzle Nh, which is executed by the control apparatus for the supercharger-equipped internal combustion engine having the above-described configuration.

Figure 2:
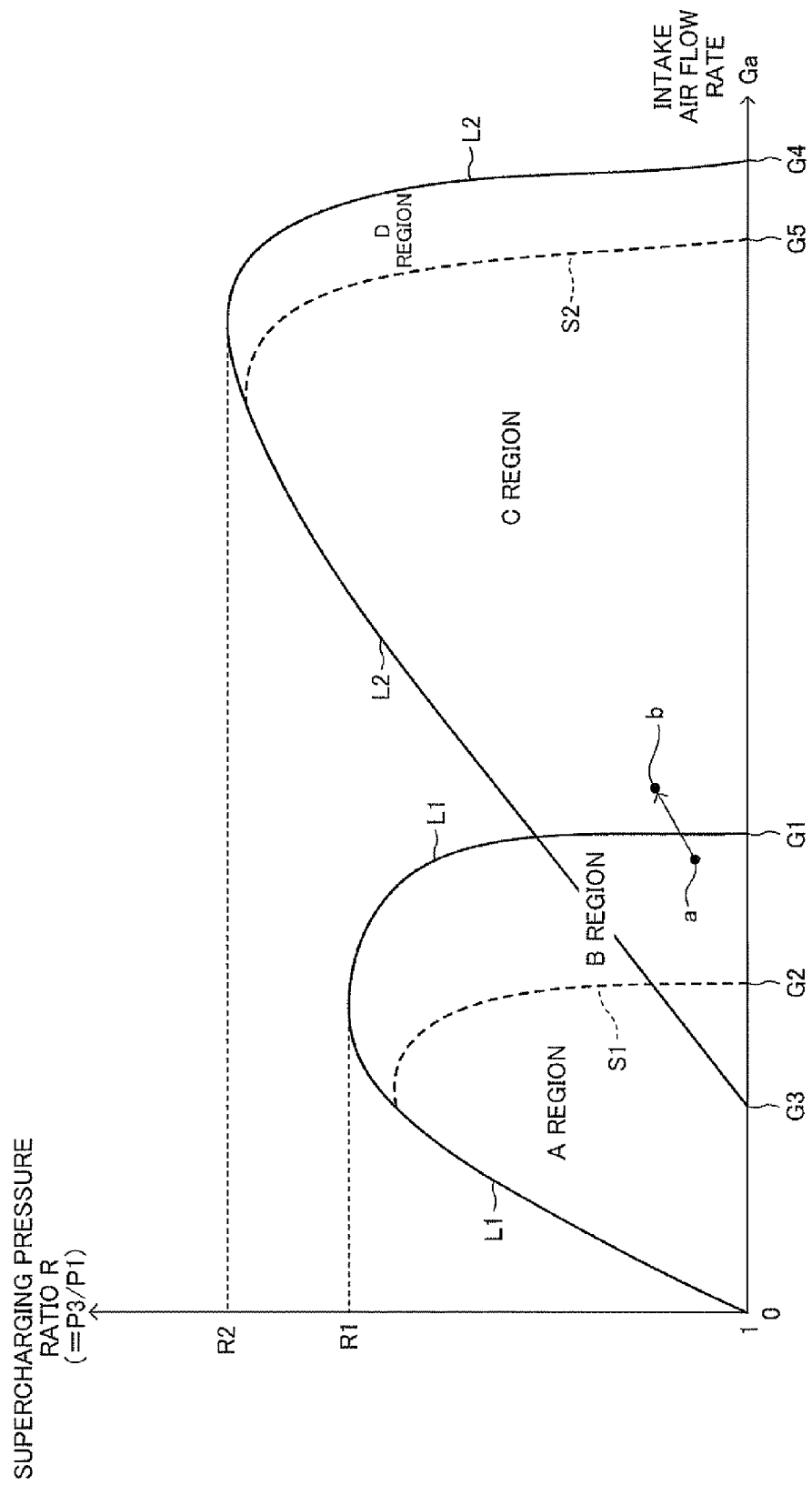
FIG. 2 is a graph showing a map which defines the relation between the combination of supercharging pressure ratio and intake air flow rate, and a selected control region and which is applied to the apparatus shown in FIG. 1.

As shown in FIG. 2, in the present example, four control regions are set for combinations of the intake air flow rat Ga and the supercharging pressure ratio R. Specifically, there are set a region (A region) in which the supercharging effect of only the first turbo charger 50 is utilized; a region (B region) in which the supercharging effects of both the first and second turbo chargers 50 and 60 are utilized; a region (C region) in which the supercharging effect of only the second turbo charger 60 is utilized; and a region (D region) in which the supercharging effect of only the second turbo charger 60 is utilized, and its supercharging effect is partially limited.

The supercharging pressure ratio R refers to the ratio (P3/P1) of the pressure P3 in the intake passage 31 at a position downstream of the first compressor 52 (and upstream of the throttle valve 34) to the pressure P1 in the intake passage 31 at a position upstream of the second compressor 62. The pressures P1 and P3 may be values detected from the pressure sensors 82 and 83, or values estimated in accordance with one of known methods.

Curves L1 and L2 (sold lines) shown in FIG. 2 are lines drawn on the basis of so-called surge and choke lines of the first and second turbo chargers 50 and 60, respectively. That is, the region surrounded by the line L1 shows a region in which the first turbo charger 50 exhibits a supercharging effect (in other words, a region in which the first turbo charger 50 can be used). Similarly, the region surrounded by the line L2 shows a region in which the second turbo charger 60 exhibits a supercharging effect (in other words, a region in which the second turbo charger 60 can be used). The minimum value of the intake air flow rate Ga in the region in which the first turbo charger 50 can be used is zero, and the maximum value of the intake air flow rate Ga in that region is G1. The maximum value of the supercharging pressure ratio R in the region in which the first turbo charger 50 can be used is R1. The minimum value of the intake air flow rate Ga in the region in which the second turbo charger 60 can be used is G3 (<G1) and the maximum value of the intake air flow rate Ga in that region is G4 (>G1). The maximum value of the supercharging pressure ratio R in the region in which the second turbo charger 60 can be used is R2 (>R1).

A region is a subregion of the region in which the first turbo charger 50 can be used, the subregion being located on one side of a curve S1 (broken line) where the intake air flow rate Ga assumes a smaller value as compared with the other side thereof. Accordingly, the maximum value of the intake air flow rate Ga in A region is G2. B region is a subregion of the region in which the first turbo charger 50 can be used, the subregion being located on the other side of the curve S1 where the intake air flow rate Ga assumes a lager value as compared with the one side thereof. Accordingly, the maximum value of the intake air flow rate Ga in B region is G1.

C region is a subregion of the region surrounded by the curve L2, the subregion being located on one side of the curve L1 where the intake air flow rate Ga assumes a larger value as compared with the other side thereof and being located on one side of a curve S2 (broken line) where the intake air flow rate Ga assumes a smaller value as compared with the other side thereof. Accordingly, the maximum value of the intake air flow rate Ga in C region is G5. D region is a subregion of the region surrounded by the curve L2, the subregion being located on the other side of the curve S2 where the intake air flow rate Ga assumes a larger value as compared with the one side thereof. Accordingly, the maximum value of the intake air flow rate Ga in D region is G4.

Next, supercharge control for each region will be described with reference to FIG. 3. In FIG. 3, the term "closed" refers to a state in which the opening area (opening degree) is constantly adjusted to the minimum value (in the present example, "0"). The term "open" refers to a state in which the opening area (opening degree) is constantly adjusted to the maximum value. The term "intermediate" refers to a state in which the opening area (opening degree) is adjusted to an intermediate value (changeable value) between the minimum value and the maximum value. The term "arbitrary" refers to a state in which the opening area (opening degree) is not adjusted (may be adjusted to any value).

As shown in FIG. 3, in the control for A region, the control valve Vhe is brought in to the "closed" state, the control valve Vhi is brought in to the "closed" state, the control valve Vle is brought in to the "closed" state, and the nozzles Nh are brought in to the "intermediate" state. That is, since the control valve Vhe is in the "closed" state, all exhaust gas passes through the first turbine 51, and, since the control valve Vhi is in the "closed" state, all intake gas passes through the first compressor 52. The first turbine 51 is rotatively driven by the energy of all the exhaust gas passing through the first turbine 51. As a result, the first compressor 52 is rotatively driven. Thus, the first turbo charger 50 exhibits a supercharging effect. The supercharging effect of the first turbo charger 50 is adjusted through adjustment of the openings (intermediate openings) of the nozzles Nh.

Meanwhile, since the control valve Vle is in the "closed" state, all the exhaust gas having passed through the first turbine 51 flows into the second turbine 61. When exhaust gas passes through the first turbine 51, the energy of that exhaust gas is consumed as a result of drive of the first turbine 51. Accordingly, the exhaust gas flowing into the second turbine 61 has a considerably decreased energy. Therefore, the second turbine 61 (accordingly, the second compressor 62) is not rotatively driven at all, or is not rotatively driven sufficiently. As a result, the second turbo charger exhibits no supercharging effect. As described above, in the control for A region, there can be obtained a state in which the first turbine 51 rotates and the second turbine 61 does not rotate at all or does not rotate sufficiently, whereby only the first turbo charger 50 exhibits a supercharging effect.

As shown in FIG. 3, the control for B region differs from the control for A region only in the point that the state of the control valve Vhe is changed from the "closed" state to the "intermediate" state. That is, since the control valve Vhe is in the "intermediate" state, a portion of exhaust gas passes through the first turbine 51, and the remaining exhaust gas flows directly into the second turbine 61 via the first exhaust bypass passage 46 (without passing through the first turbine 51). Thus, the first turbine 51 (accordingly, the first compressor 52) is rotatively driven by the energy of a "portion of the exhaust gas" passing through the first turbine 51, whereby the first turbo charger exhibits a supercharging effect.

Meanwhile, the "remaining exhaust gas" flows into the second turbine 61 without consuming its energy for drive of the first turbine 51. Accordingly, the exhaust gas flowing into the second turbine 61 has a relatively large energy. Therefore, the second turbine 61 (accordingly, the second compressor 62) is rotatively driven, whereby the second turbo charger 60 exhibits a supercharging effect. As described above, in the control for B region, there is obtained a state in which both the first and second turbines 51 and 61 rotate, whereby both the first and second turbo chargers 50 and 60 exhibit their supercharging effects.

As shown in FIG. 3, the control for C region differs from the control for B region only in the point that the state of the control valve Vhe is changed from the "intermediate" state to the "open" state; the state of the control valve Vhi is changed from the "closed" state to the "open" state; and the state of the nozzles Nh is changed from the "intermediate" state to the "arbitrary" state. That is, since the control valve Vhe is in the "open" state, all (almost all) exhaust gas flows directly into the second turbine 61 via the first exhaust bypass passage 46 (without passing through the first turbine 51). Therefore, the nozzles Nh are not required to be controlled, and are in the "arbitrary" state. Thus, the first turbine 51 (accordingly, the first compressor 52) is not rotatively driven at all, or is not rotatively driven sufficiently, whereby the first turbo charger 50 exhibits no supercharging effect. Also, since the control valve Vhi is in the "open" state, no (almost no) intake gas flows through the first compressor 52 (all (almost all) intake gas passes through the first intake bypass passage 36). Thus, the first turbo charger 50 exhibits no supercharging effect even if the first compressor 52 is rotatively driven.

Meanwhile, all (almost all) exhaust gas flows into the second turbine 61 without consuming its energy for drive of the first turbine 51. Accordingly, the energy of the exhaust gas flowing into the second turbine 61 is sufficiently large. Therefore, the second turbine 61 (accordingly, the second compressor 62) is rotatively driven, whereby the second turbo charger 60 exhibits a supercharging effect. As described above, in control for C region, there is obtained a state in which the first turbine 51 does not rotate at all or does not rotate sufficiently, and the second turbine 61 rotates, whereby only the second turbo charger 60 exhibits a supercharging effect.

As shown in FIG. 3, the control for D region differs from the control for C region only in the point that the state of the control valve Vle is changed from the "closed" state to the "open" state. That is, as in C region, in D region, only the second turbo charger 60 exhibits a supercharging effect. Meanwhile, a portion of the exhaust gas having passed through the first exhaust bypass passage 46 passes through the second exhaust bypass passage 47 (without passing the second turbine 61). Thus, an increase in the flow rate of exhaust gas flowing into the second turbine 61 can be restrained. As a result, an excessive supercharging effect caused by an increase in engine rotational speed can be partially limited.

Figure 4:
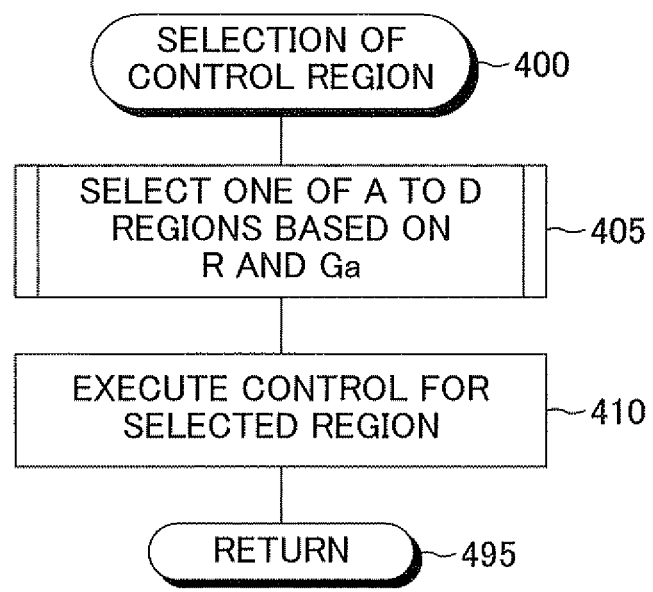
FIG. 4 is a flowchart showing a program for control region selection executed by the apparatus shown in FIG. 1.
Figure 5:
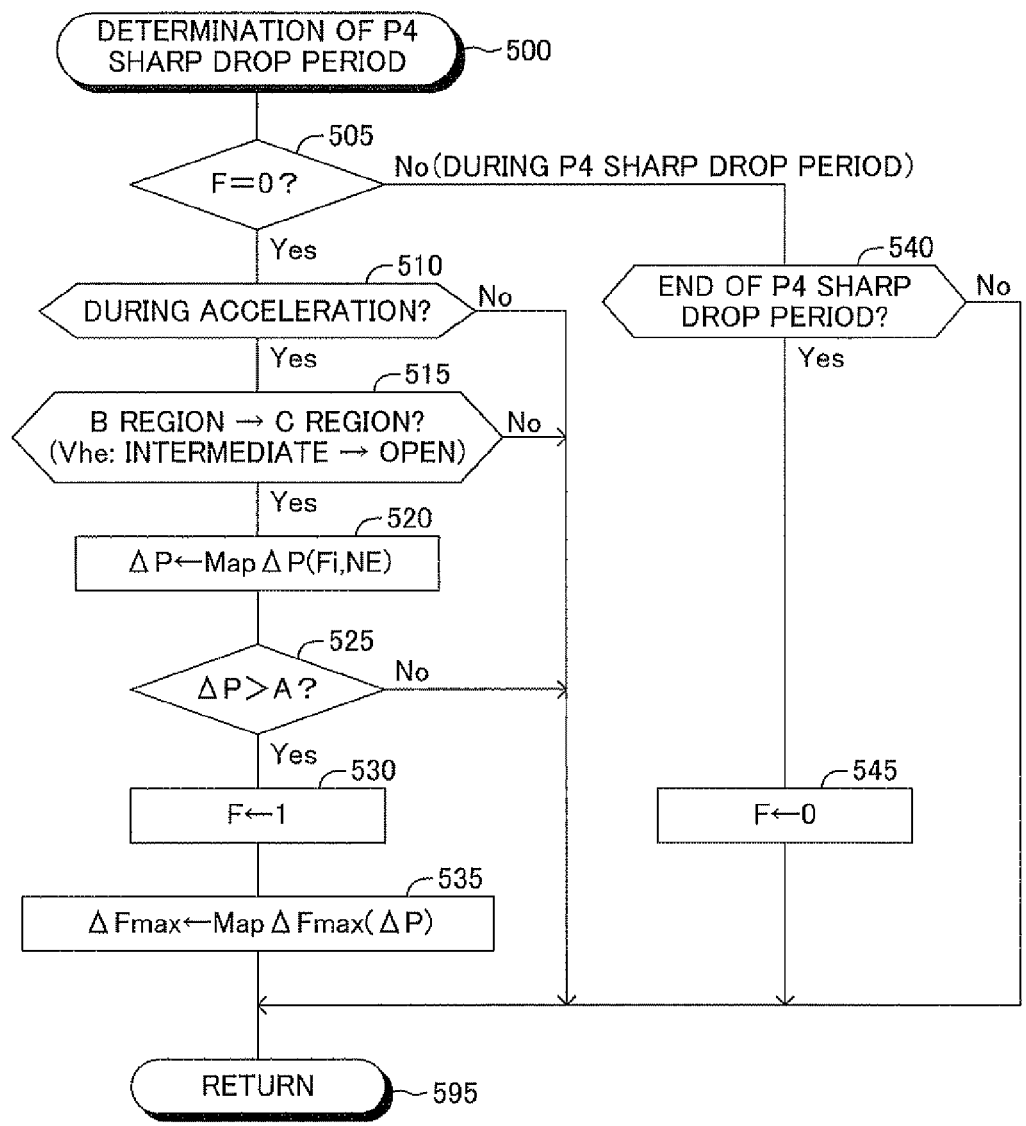
FIG. 5 is a flowchart showing a program for determination of exhaust pressure sharp drop period executed by the apparatus shown in FIG. 1.
Figure 6:
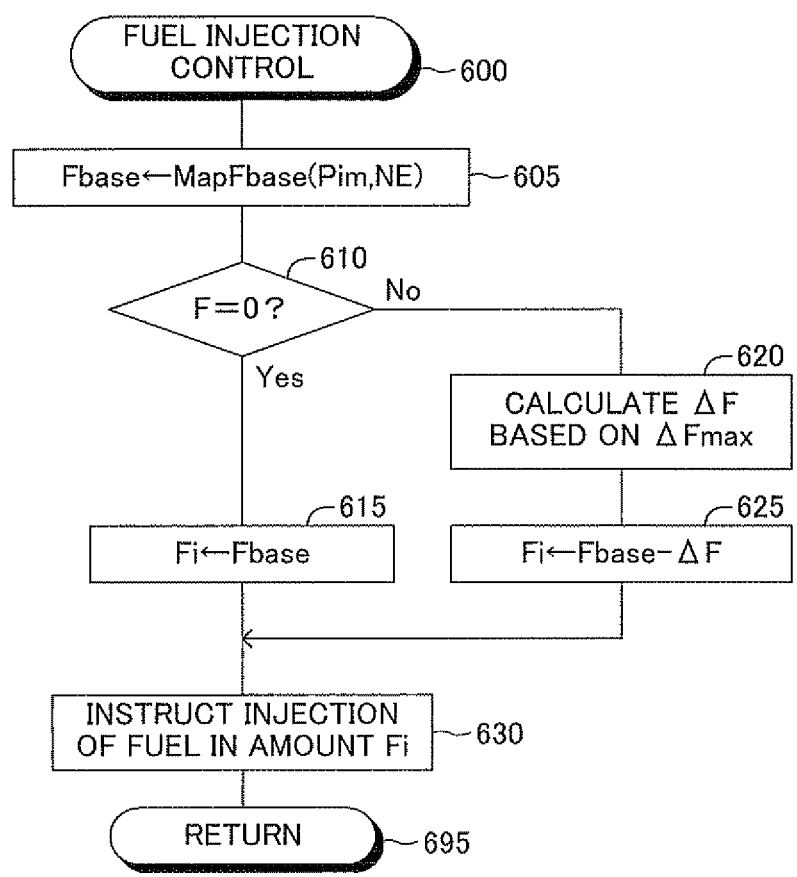
FIG. 6 is a flowchart showing a program for fuel injection control executed by the apparatus shown in FIG. 1.

Next, actual operation of the present apparatus for supercharge control will be described with reference to flowcharts shown in FIGS. 4 to 6. The programs shown by these flowcharts are executed by the CPU provided in the ECU 91.

First, a program (routine) for "control region selection" shown in FIG. 4 will be described. The CPU repeatedly executes this program at predetermined timing (e.g., at intervals of 8 msec). In step 405, the CPU first acquires the present values of the supercharging pressure ratio R and the intake air flow rate Ga, and selects one control region from A region, B region, C region, and D region, on the basis of the combination of the acquired R and Ga (hereinafter also referred to as the "present operation state"), and the map shown in FIG. 2.

In step 410, the CPU executes the above-described supercharge control corresponding to the selected control region (see FIG. 3), and ends the current execution of the present program.

Next, there will be described a program (routine) shown in FIG. 5 for determining the period of a sharp drop in exhaust pressure P4 (hereinafter referred to as "determination of the P4 sharp drop period"). The CPU repeatedly executes this program as well at predetermined timing (e.g., at intervals of 8 msec). The exhaust pressure P4 refers to the pressure within the exhaust passage 41 at a position upstream of the first turbine 51 (pressure within the exhaust manifold).

Figure 9:
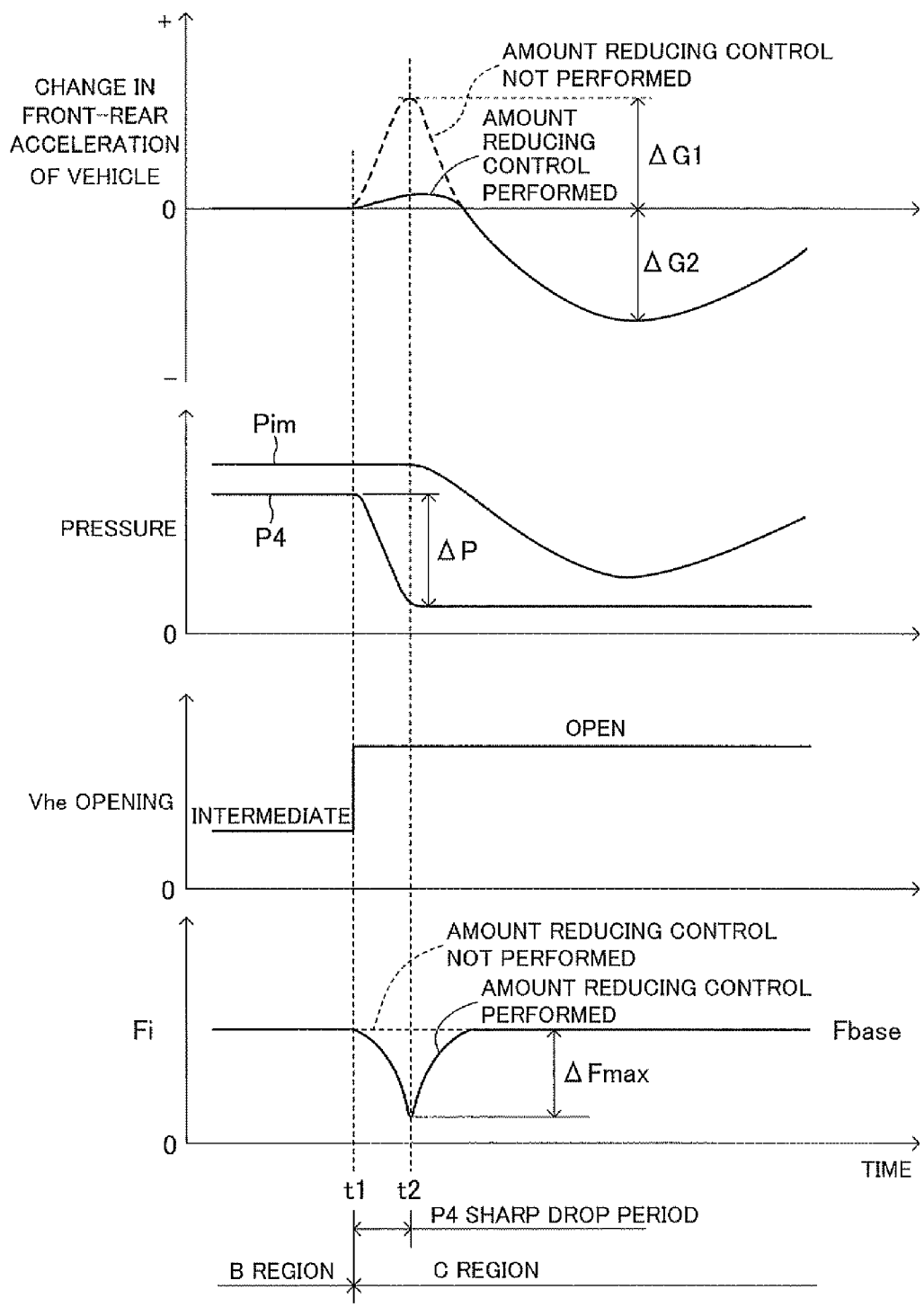
FIG. 9 is a time chart showing example changes in various physical quantities at the time when the control region shifts from B region to C region during acceleration.

First, in step 505, the CPU determines whether or not a flag F is "0." The flag F shows that the present point in time is not in the "P4 sharp drop period" when its value is "0," and shows that the present point in time is in the "P4 sharp drop period" when its value is "1." The "P4 sharp drop period" refers to a period in which the exhaust pressure P4 sharply drops because of switching of the control valve Vhe from the "intermediate" state to the "open" state as a result of shifting of the control region from B region to C region (see time t1 to time t2 of FIG. 9, which will be described later).

The description will be continued under the assumption that the present point in time is not in the P4 sharp drop period (F=0). In such a case (the CPU makes a "Yes" determination in step 505), in step 510, the CPU determines whether or not the vehicle is in an "acceleration state." In the case where the CPU makes a "No" determination, the CPU ends the current execution of the present program. The "acceleration state" refers to a state in which the engine rotational speed NE is increasing (the speed of the vehicle on which this internal combustion engine is mounted is increasing).

In the case where the vehicle is in the "acceleration state" (the CPU makes a "Yes" determination in step 510), in step 515, the CPU determines whether or not the present point in time is immediately after the control region has shifted from B region to C region. In the case where the CPU makes a "No" determination, the CPU ends the current execution of the present program. Specifically, in this step 515, for example, the CPU determines whether or not the present point in time is immediately after the control region selected in step 405 of FIG. 4 has shifted from B region to C region; determines whether or not the present point in time is immediately after the CPU has instructed the control valve Vhe to change its state from the "intermediate" state to the "open" state and instructed the control valve Vhi to change its state from the "closed" state to the "open" state, through execution of step 410; or determines whether or not the present point in time is immediately after the control valve Vhe has actually changed its state from the "intermediate" state to the "open" state and the control valve Vhi has actually changed its state from the "closed" state to the "open" state, as a result of execution of step 410.

In the case where the present point in time is immediately after the control region has shifted from B region to C region (the CPU makes a "Yes" determination in step 515), in step 520, the CPU determines the amount ΔP of a drop in the exhaust pressure P4 stemming from the change of the state of the control valve Vhe from the "intermediate" state to the "open" state, on the basis of a table MapΔP, the present (latest) fuel injection amount Fi, and the present engine rotational speed NE. The table MapΔP is a table (map) which defines the relation between ΔP and the "combination of Fi and NE," and can be obtained in advance through an experiment, simulation, or the like. Subsequently, in step 525, the CPU determines whether or not the drop amount ΔP is greater than a predetermined very small value (constant value) A. In the case where the CPU makes a "No" determination, the CPU ends the current execution of the present program.

Meanwhile, in the case where the drop amount ΔP is greater than the value A (the CPU makes a "Yes" determination in step 525), in step 530, the CPU changes the value of the flag F from "0" to "1." In step 535 subsequent thereto, the CPU determines an injection amount Fmax (see FIG. 9, which will be described later) which corresponds to the momentary torque increase stemming from the sharp drop in the exhaust pressure P4 (equivalent to the torque increase), on the basis of a table MapΔFmax and the drop amount ΔP of the exhaust pressure P4 obtained in step 520. Subsequently, the CPU ends the current execution of the present program. Notably, the injection amount Fmax can be said to be an increase in injection amount which is required to attain a torque increase equal to the momentary torque increase (peak value) stemming from the sharp drop in the exhaust pressure P4 by increasing the injection amount only.

Figure 7:
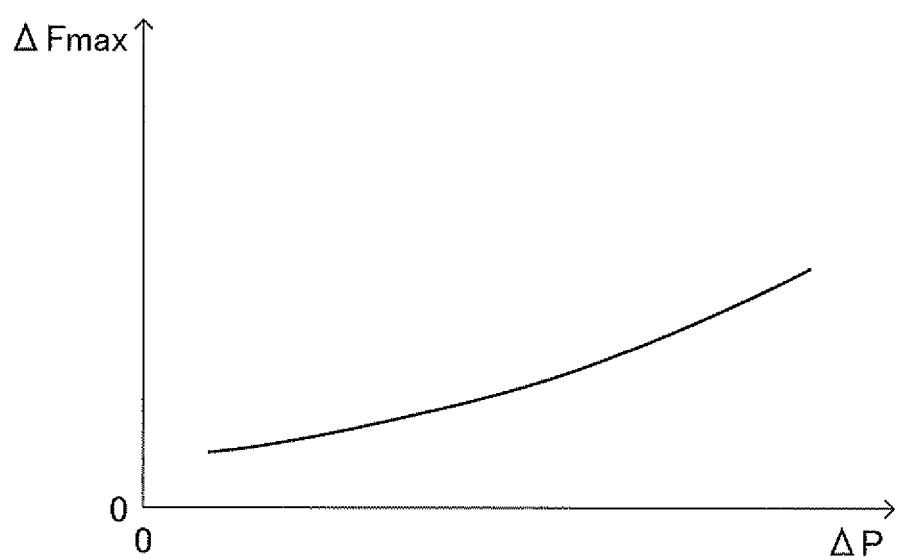
FIG. 7 is a graph showing a map defining the relation between exhaust pressure drop amount and injection amount corresponding to torque increase caused by exhaust pressure drop.

As shown in FIG. 7, the table MapΔFmax is a table (map) which defines the relation between ΔFmax and ΔP, and is obtained in advance through an experiment, simulation, or the like. As shown in FIG. 7, the greater the drop amount ΔP, the greater the injection amount ΔFmax. This relation is determined in consideration of the fact that the greater the drop amount ΔP, the greater the momentary torque increase stemming from the sharp drop of P4.

As described above, the value of the flag F is changed from "0" to "1" when the vehicle is in the acceleration state, the present point in time is immediately after the control region has shifted from B region to C region, and the drop amount ΔP of the exhaust pressure P4 is greater than the very small value A. That is, the present state changes from the state in which the present point in time is not in the "P4 sharp drop period" to the state in which the present point in time is in the "P4 sharp drop period." In addition, in this case, the injection amount ΔFmax is calculated on the basis of the drop amount ΔP (accordingly, on the basis of Fi and NE). Notably, both or one of steps 510 and step 525 may be omitted.

When the value of the flag F is changed from "0" to "1" as described above, after that point in time, the CPU makes a "No" determination in step 505 and executes step 540 every time the CPU executes this program. In step 540, the CPU determines whether or not the P4 sharp drop period has ended. In the case where the CPU makes a "No" determination, the CPU ends the current execution of the present program. The P4 sharp drop period is determined to have ended, for example, when the superchrged pressure Pim is determined to have started to decrease (after the control region had shifted from B region to C region (see time t2 of FIG. 9, which will be described later). This determination is made on the basis of the fact that the sharp drop in the exhaust pressure P4 (accordingly, the momentary increase of the output torque) ends near the point where the supercharged pressure starts to decrease.

In the case where the CPU determines that the P4 sharp drop period has ended (the CPU makes a "Yes" determination in step 540), the CPU changes the value of the flag F from "1" to "0" in step 545, and ends the current execution of the present program. Thus, the present state changes from the state in which the present point in time is in the "P4 sharp drop period" to the state in which the present point in time is not in the "P4 sharp drop period."

Next, a program (routine) for "fuel injection control" shown in FIG. 6 will be described. This program is repeatedly executed every time a timing which precedes the timing of fuel injection (for example, timing near the compression top dead center) by a predetermined crank angle has come for a cylinder into which fuel is to be injected (fuel injection cylinder).

First, in step 605, the CPU determines a base fuel injection amount Fbase on the basis of a table MapFbase, the present superchrged pressure Pim, and the present engine speed NE. Subsequently, in step 610, the CPU determines whether or not the value of F is "0." First, the case where the present point in time is not in the "P4 sharp drop period" (the CPU makes a "Yes" determination in step 610) will be described. In this case, in step 615, the CPU sets the fuel injection amount Fi to a value equal to Fbase. Subsequently, in step 630, the CPU instructs the in-cylinder injection valve 21 of the fuel injection cylinder to inject fuel in an amount equal to Fi. The CPU then ends the current execution of the present program. As described above, in the case where present point in time is not in the "P4 sharp drop period," fuel is injected in an amount equal to Fbase.

Meanwhile, when the value of the flag F changes from "0" to "1" as a result of shifting of the control region from B region to C region (that is, when the present state changes from the state in which the present point in time is not in the "P4 sharp drop period" to the state in which the present point in time is in the "P4 sharp drop period") in this sate, the CPU makes a "No" determination in step 610, and executes step 620 every time the CPU executes this program. In step 620, the CPU calculates an injection amount reduction amount ΔF on the basis of ΔFmax calculated in the above-mentioned step 535.

Subsequently, in step 625, the CPU sets the fuel injection amount Fi to a value obtained by subtracting ΔF from Fbase. The CPU then performs the processing of the above-described step 630, and ends the current execution of the present program. As a result, in the P4 sharp drop period, fuel is injected in an amount obtained by subtracting ΔF from Fbase. The above-described control which is executed in the P4 sharp drop period in order to inject fuel in the "amount obtained by subtracting ΔF from Fbase," instead of an "amount equal to Fbase" will be called "amount reducing control."

In the P4 sharp drop period, the reduction amount ΔF may be fixedly set to ΔFmax, or may be varied within a range not exceeding ΔFmax. For example, after the start of the Pr sharp drop period, ΔF may be set such that it gradually increases from zero toward ΔFmax. In the above, the actual operation of the present apparatus for supercharge control has been described.

(Action and Effect Provided by Amount Reducing Control)

Figure 8:
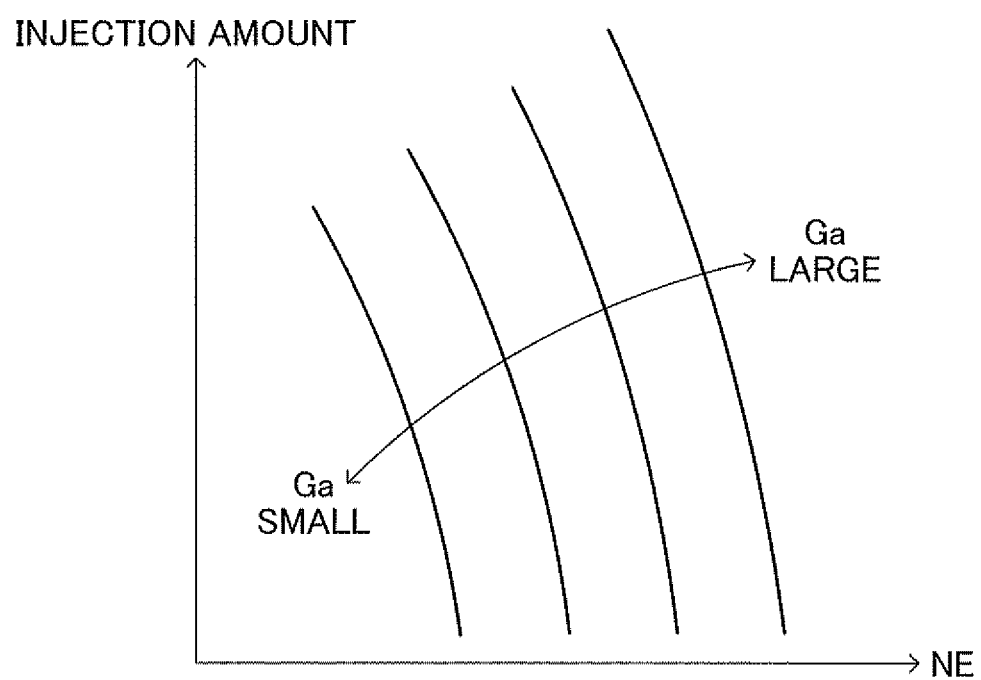
FIG. 8 is a graph showing the relation between intake air flow rate, and engine rotational speed and injection amount.

Next, there will be described the action and effect provided by the amount reducing control executed in the P4 sharp drop period. As shown in FIG. 8, the intake air flow rate Ga strongly depends on the engine rotational speed NE, and increases (decreases) as the engine rotational speed NE increases (decreases). Accordingly, in the process in which the vehicle on which this engine 10 is mounted is accelerating, Ga increases as a result of increase of NE. This process corresponds to the shift of the control region from A region to B region, then to C region, and then to D region in FIG. 2.

Now, it is assumed the case where the control region shifts from B region to C region as a result of acceleration of the vehicle in a state in which the control region is in B region (see the shift from point a to point b in FIG. 2). Action or operation in this assumed case will be described with reference to FIG. 9. FIG. 9 shows example changes in various physical quantities in the case where the control region is in B region before time t1 and the control region shifts from B region to C region at time t1 as a result of acceleration of the vehicle.

Before time t1, since the control region is in B region, the control valve Vhe is in the "intermediate" state, and the control valve Vhi is in the "closed" state. Thus, both the first and second turbines 51 and 61 are rotatively driven, whereby both the first and second turbo chargers 50 and 60 exhibit their supercharging effects.

When time t1 has come, as a result of shifting of the control region from B region to C region, the control valve Vhe is switched from the "intermediate" state to the "open" state, and the control valve Vhi is switched from the "closed" state to the "open" state. As a result of the switching of the control valve Vhe from the "intermediate" state to the "open" state, the opening area of the first exhaust bypass passage 46 increases, and, immediately after time t1, the exhaust resistance of exhaust gas decreases sharply. As a result, the exhaust pressure P4 also sharply drops immediately after time t1, and this dropping continues up to time t2.

The period (time t1 to time t2) in which the exhaust pressure P4 sharply drops will be referred to as the "P4 sharp drop period." The drop amount ΔP of P4 in the P4 sharp drop period greatly depends on the fuel injection amount Fi and the engine rotational speed NE. Therefore, in step 520 of FIG. 5, this ΔP is obtained on the basis of the combination of Fi and NE.

Furthermore, as a result of the switching of the control valve Vhe from the "intermediate" state to the "open" state and the switching of the control valve Vhi from the "closed" state to the "open" state, the rotative drive of the first turbine 51 is stopped. The rotational speed of the first turbine 51 (accordingly, the first compressor 52) whose rotative drive has been stopped decreases in accordance with mainly the inertias of the first turbine 51 and the first compressor 52. As a result, after time t1, the rotational speed of the first turbine 51 (accordingly, the first compressor 52) is maintained in a region in which the rotational speed is sufficiently high so that the first turbo charger can exhibit a satisfactory supercharging effect) over a short period of time, and decreases relatively slowly while deviating from that region. Accordingly, the superchrged pressure Pim also decreases relatively slowly from a point slightly delayed from time t1. The time at which the decrease of the superchrged pressure Pim starts roughly coincides with the end of the P4 sharp drop period (a time at which the decrease of P4 ends; time t2). Therefore, in step 540 of FIG. 5, the end of the P4 sharp drop period is determined on the basis of the time at which the decrease of Pim starts.

Here, there will be described the case in which, unlike the present example, the above-described amount reducing control is not executed in the P4 sharp drop period (that is, the case where Fi is maintained at Fbase in the P4 sharp drop period as well; see a broken line in FIG. 9). In this case, in the P4 sharp drop period (time t1 to time t2), there arises a phenomenon in which the output torque of the internal combustion engine increases momentarily as a result of an increase in combustion efficiency, etc., caused by a sharp drop in the exhaust pressure P4 (see ΔG1 in FIG. 9).

In addition, there arises a phenomenon that, as a result of the superchrged pressure Pim decreasing relatively slowly from a point near time t2, after the point near time t2, the output torque of the internal combustion engine decreases relatively slowly (see ΔG2 in FIG. 9).

As described above, in the case where the above-described amount reducing control is not executed, there arises a phenomenon in which, in the P4 sharp drop period (time t1 to time t2), the output torque of the internal combustion engine momentarily increases because of a sharp drop in the exhaust pressure P4, and, after the end of the P4 sharp drop period (after time t2), the output torque of the internal combustion engine decreases relatively slowly because of a decrease in the superchrged pressure Pim. In other words, a series of phenomena in which the output torque increases and decreases arise. Therefore, a passenger of the vehicle may feel the series of phenomena as a relatively large torque step (($\Delta$G1+$\Delta$G2). Notably, after a sufficiently long period of time elapses after the P4 sharp drop period, the superchrged pressure Pim increases as a result of an increase in the supercharging effect of the second turbo charger 60.

In contrast, in the present example, the above-described amount reducing control is executed over the P4 sharp drop period (time t1 to time t2). Thus, Fi is reduced from Fbase by the reduction amount $\Delta$F, whereby the output torque decreases (see a solid line in FIG. 9). In the example shown in FIG. 9, the reduction amount $\Delta$F is set in the P4 sharp drop period such that it is "0" at time t1, increases with time, and becomes $\Delta$Fmax at time t2. The reason why the reduction amount $\Delta$F is set in the above-described manner is that, in the case where the amount reducing control is not executed, the output torque increases with time in the P4 sharp drop period. With this control, the "momentary increase in the output torque attributable to a sharp drop in the exhaust pressure P4" can be restrained to a possible extent.

Notably, in the example shown in FIG. 9, after the end of the P4 sharp drop period (after time t2), the reduction amount $\Delta$F is gradually decreased from $\Delta$Fmax toward zero, rather than immediately set to zero. Thus, it becomes possible to restrain a new torque step, which would otherwise be generated due to a stepwise change of Fi.

As described above, through execution of the amount reducing control, the above-described toque step can be reduced by an amount corresponding to a decrease in the output torque (approximately equal to $\Delta$G1) caused by a decrease in Fi. Moreover, this torque step can be reduced further by a driver of the vehicle by greatly depressing an accelerator pedal after the shift of the control region (after time t1).

As having been described above, the first embodiment of the control apparatus for a supercharger-equipped internal combustion engine includes a series-type 2-stage supercharger. According to the first embodiment, when the control region shifts from B region to C region as a result of acceleration of the vehicle, occurrence of the "momentary increase in the output torque of the internal combustion engine attributable to a sharp drop in the exhaust pressure P4" can be restrained through execution of the amount reducing control. As a result, it is possible to reduce a torque step which a passenger may feel after the shifting of the control region from B region to C region.

Second Embodiment

Figure 10:
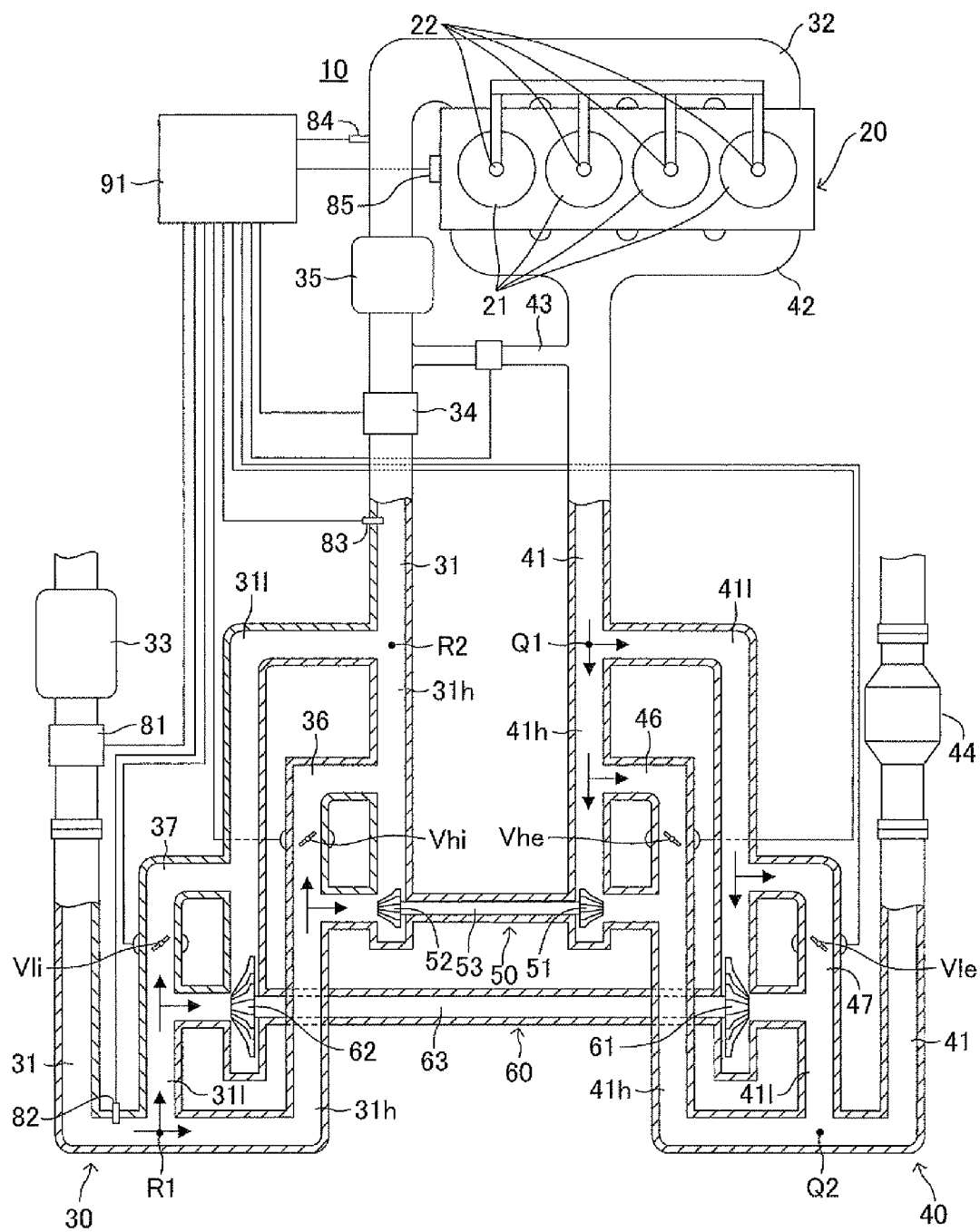
FIG. 10 is a schematic diagram showing the entirety of a system in which a control apparatus according to a second embodiment of the present invention is applied to an internal combustion engine equipped with a parallel-type 2-stage supercharger.
Figure 12:
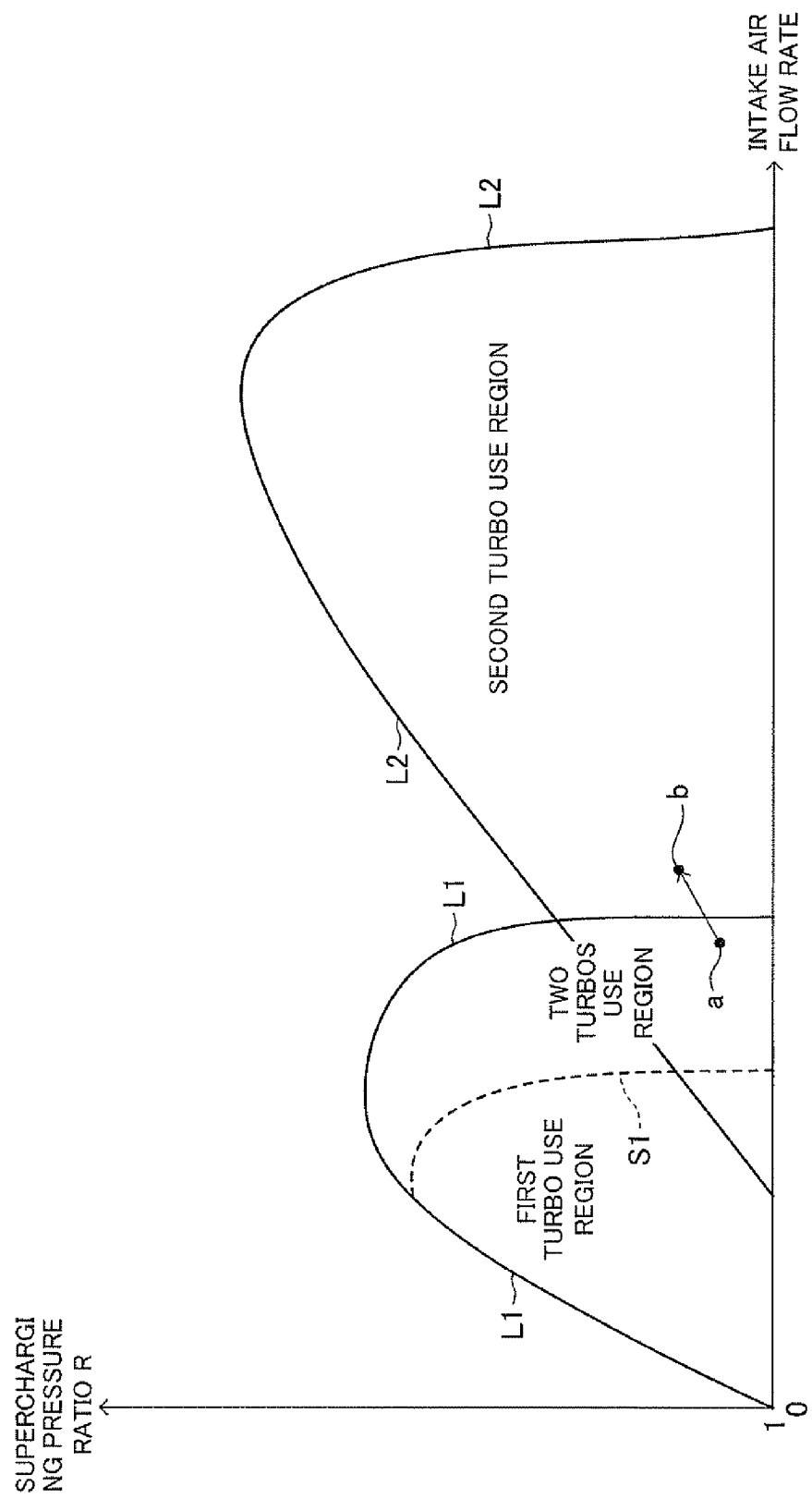
FIG. 12 is a graph showing a map which defines the relation between the combination of supercharging pressure ratio and intake air flow rate, and a selected control region and which is applied to the conventional apparatus.

Next, there will be described a second embodiment of the control apparatus for a supercharger-equipped internal combustion engine according to the present invention. As shown in FIG. 10, the second embodiment differs from the first embodiment including a series-type 2-stage supercharger in that a parallel-type 2-stage supercharger is provided. In FIG. 10, constituent elements which are the same or equivalent to those shown in FIG. 1 are denoted by the same reference numerals as those used in FIG. 1.

As shown in FIG. 10, in the second embodiment, the intake passage 31 branches at a branching point R1 into first and second intake passages 31h and 31l, and these first and second intake passages 31h and 31l merge together at a merging point R2. The exhaust passage 41 branches at a branching point Q1 into first and second exhaust passages 41h and 41l, and these first and second exhaust passages 41h and 41l merge together at a merging point Q2.

The first and second turbines 51 and 61 are disposed in the first and second exhaust passages 41h and 41l, respectively. The first and second compressors 52 and 62 are disposed in the first and second intake passages 31h and 31l, respectively. Notably, the nozzles Nh are not provided around the first turbine 51.

The first intake bypass passage 36 establishes a bypass between portions of the first intake passage 31h located upstream and downstream, respectively, of the first compressor 52. The control valve Vhi is disposed in the first intake bypass passage 36. Similarly, a second intake bypass passage 37 establishes a bypass between portions of the second intake passage 31l located upstream and downstream, respectively, of the second compressor 62. The control valve Vli is disposed in the second intake bypass passage 37. The control valve Vli adjusts the minimum opening sectional area of the second intake bypass passage 37 (second intake bypass area). The control valve Vli is driven by an unillustrated actuator.

The first exhaust bypass passage 46 establishes a bypass between portions of the first exhaust passage 41h located upstream and downstream, respectively, of the first turbine 51. The control valve Vhe is disposed in the first exhaust bypass passage 46. Similarly, a second exhaust bypass passage 47 establishes a bypass between portions of the second exhaust passage 41l located upstream and downstream, respectively, of the second turbine 61. The control valve Vle is disposed in the second exhaust bypass passage 47.

In the second embodiment, the control valves Vhe, Vhi, Vle, and Vli are adjusted as shown in FIG. 11, which corresponds to FIG. 3, whereby supercharge control for each of A to D regions is achieved. Since the adjustment of these control valves Vhe, Vhi, Vle, and Vli is known, its detailed description will be omitted.

As shown in FIG. 11, as in the case of the first embodiment, in the second embodiment as well, when the control region shifts from B region to C region as a result of acceleration of the vehicle, the control valve Vhe is switched from the "intermediate" state to the "open" state, and the control valve Vhi is switched from the "closed" state to the "open" state. Accordingly, as in the case of the first embodiment, (in the case where the above-described amount reducing control is not executed), a momentary increase in the output torque attributable to a sharp drop in the exhaust pressure P4 and a subsequent increase in the output torque attributable to a decrease in the superchrged pressure Pim occur, whereby a relative large torque step is generated.

Accordingly, in the second embodiment, as in the case of the first embodiment, amount reducing control similar to the above-described amount reducing control is executed when the control region shifts from B region to C region. Thus, the occurrence of the "momentary increase in the output torque of the internal combustion engine attributable to a sharp drop in the exhaust pressure P4" can be restrained. That is, the action and effect substantially the same as those of the first embodiment can be attained.

The present invention is not limited to the above-described first and second embodiments, and various modifications can be employed within the scope of the present invention. For example, although the second exhaust bypass passage 47 and the control valve Vle are provided in the first and second embodiments, they may be omitted. Furthermore, in the first embodiment, the nozzles Nh may be omitted.

In the first and second embodiments, a subregion of the region surrounded by the curve L2 in FIG. 2 which is located on one side of the curve L1 where the intake air flow rate Ga assumes a larger value is divided into C region and D region. However, C region and D region may be merged into a single region (C region).

In the first embodiment, there may be provided a second intake bypass passage for establishing a bypass between a portion of the intake passage 31 located upstream of the second compressor 62 and a portion of the intake passage 31 located between the first and second compressors 52 and 62; and a control valve Vli disposed in the second intake bypass passage. In this case, the control valve Vli is opened and closed in the same pattern as the open/close pattern of the control valve Vle.

In addition, in the first embodiment, like the first turbine 51 having the nozzles Nh, the second turbine 61 may has a plurality of nozzles Nl provided around the second turbine 61.

The invention claimed is:

1. An apparatus for a supercharger-equipped internal combustion engine having an exhaust passage, the apparatus comprising:
   a first turbo charger including: a first turbine disposed in the exhaust passage of the engine and driven by energy of an exhaust gas discharged from the engine, and a first compressor disposed in an intake passage of the engine and driven by the first turbine;
   a second turbo charger including: a second turbine disposed in the exhaust passage at a position downstream of the first turbine, the second turbine being driven by energy of the exhaust gas discharged from the engine and being greater in size than the first turbine, and a second compressor disposed in the intake passage at a position upstream of the first compressor, the second compressor being driven by the second turbine and being greater in size than the first compressor;
   a first exhaust bypass passage forming a bypass between a portion of the exhaust passage located upstream of the first turbine and a portion of the exhaust passage located between the first and second turbines;
   a first intake bypass passage forming a bypass between a portion of the intake passage located between the first and second compressors and a portion of the intake passage located downstream of the first compressor;
   a first exhaust control valve disposed in the first exhaust bypass passage and adapted to adjust a first exhaust bypass area, which is the minimum opening sectional area of the first exhaust bypass passage;
   a first intake control valve disposed in the first intake bypass passage and adapted to adjust a first intake bypass area, which is the minimum opening sectional area of the first intake bypass passage;
   an electronic control unit programmed to:
   acquire a supercharging pressure ratio, which is the ratio of the pressure in the intake passage at a position downstream of the first compressor to the pressure in the intake passage at a position upstream of the second compressor;
   acquire the flow rate of air passing through the intake passage;
   determine whether a combination of the supercharging pressure ratio and the air flow rate falls within a two turbos use region in which supercharging effects of both the first and second turbo chargers are utilized, or a second turbo use region which is adjacently located on one side of the two turbos use region where the air flow rate assumes a larger value as compared with the other side thereof and in which a supercharging effect of only the second turbo charger is utilized;
   control the first exhaust control valve and the first intake control valve such that the first exhaust bypass area assumes an intermediate value between its minimum and maximum values, and the first intake bypass area assumes its minimum value, when the combination of the supercharging pressure ratio and the air flow rate is determined to fall within the two turbos use region, and for controlling the first exhaust control valve and the first intake control valve such that the first exhaust bypass area assumes its maximum value and the first intake bypass area assumes its maximum value, when the combination of the supercharging pressure ratio and the air flow rate is determined to fall within the second turbo use region; and
   inject fuel amount determined based on an operation state of the internal combustion engine, wherein:
   the electronic control unit performs, over a predetermined period, amount reducing control for reducing the injection amount of the fuel, when the combination of the supercharging pressure ratio and the air flow rate shifts from the two turbos use region to the second turbo use region, and
   the electronic control unit is configured such that: (i) when the amount reducing control is not performed, the electronic control unit injects fuel in a base fuel injection amount determined based on a pressure (Pim) in an intake manifold and a rotational speed (NE) of the internal combustion engine, and (ii) when the amount reducing control is performed, the electronic control unit injects fuel in an amount smaller than the base fuel injection amount.

2. An apparatus for a supercharger-equipped internal combustion engine according to claim 1, wherein
   the electronic control unit is configured to determine an amount by which the injection amount of the fuel is reduced in the amount reducing control, on the basis of an operation speed of the internal combustion engine and the injection amount of the fuel.

3. An apparatus for a supercharger-equipped internal combustion engine according to claim 1, wherein
   the electronic control unit is configured such that, when the combination of the supercharging pressure ratio and the air flow rate shifts from the two turbos use region to the second turbo use region, the electronic control unit determines whether or not the amount reducing control is to be performed, on the basis of an operation speed of the internal combustion engine and the injection amount of the fuel.

4. An apparatus for a supercharger-equipped internal combustion engine according to claim 1, wherein
   the electronic control unit is configured to start the amount reducing control when the combination of the supercharging pressure ratio and the air flow rate has shifted from the two turbos use region to the second turbo use region, and then end the amount reducing control when the pressure of intake gas flowing into a combustion chamber of the internal combustion engine is determined to have started to decrease.

5. An apparatus for a supercharger-equipped internal combustion engine according to claim 1, wherein
   the electronic control unit is configured to determine whether or not the combination of the supercharging pressure ratio and the air flow rate falls within a first turbo use region which is adjacently located on one side of the two turbos use region where the air flow rate assumes a smaller value as compared with the opposite side, and in which a supercharging effect of the first turbo charger is utilized; and the electronic control unit is configured to control the first exhaust control valve and the first intake control valve such that the first exhaust bypass area assumes its minimum value, and the first intake bypass area assumes its minimum value, when the combination of the supercharging pressure ratio and the air flow rate is determined to fall within the first turbo use region.

6. An apparatus for a supercharger-equipped internal combustion engine according to claim 1, further comprising:

a second exhaust bypass passage which establishes a bypass between a portion of the exhaust passage located between the first and second turbines, and a portion of the exhaust passage located downstream of the second turbine; and a second exhaust control valve disposed in the second exhaust bypass passage and adapted to adjust a second exhaust bypass area, which is the minimum opening sectional area of the second exhaust bypass passage; and the electronic control unit is configured to control the second exhaust control valve such that the second exhaust bypass area assumes its maximum value only when the combination of the supercharging pressure ratio and the air flow rate falls within a bypass region, which is a portion of the second turbo use region in which the air flow rate assumes a larger value as compared with the remaining portion of the second turbo use region, and the second exhaust bypass area assumes its minimum value when the combination of the supercharging pressure ratio and the air flow rate does not fall within the bypass region.

7. An apparatus for a supercharger-equipped internal combustion engine which is applicable to an internal combustion engine having an exhaust passage branching into first and second exhaust passages at an intermediate point, and an intake passage having first and second intake passages merging together at an intermediate point, the apparatus comprising:

a first turbo charger including: a first turbine disposed in the first exhaust passage and driven by energy of an exhaust gas discharged from the engine, and a first compressor disposed in the first intake passage and driven by the first turbine;

a second turbo charger including: a second turbine disposed in the second exhaust passage, the second turbine being driven by energy of the exhaust gas discharged from the engine, and being greater in size than the first turbine, and a second compressor disposed in the second intake passage, the second compressor being driven by the second turbine, and being greater in size than the first compressor; a first exhaust bypass passage forming a bypass between a portion of the first exhaust passage located upstream of the first turbine and a portion of the first exhaust passage located downstream of the first turbine;

a first intake bypass passage forming a bypass between a portion of the first intake passage located upstream of the first compressor and a portion of the first intake passage located downstream of the first compressor;

a second exhaust bypass passage forming a bypass between a portion of the second exhaust passage located upstream of the second turbine and a portion of the second exhaust passage located downstream of the second turbine;

a second intake bypass passage forming a bypass between a portion of the second intake passage located upstream of the second compressor and a portion of the second intake passage located downstream of the second compressor;

a first exhaust control valve disposed in the first exhaust bypass passage and adapted to adjust a first exhaust bypass area, which is the minimum opening sectional area of the first exhaust bypass passage;

a first intake control valve disposed in the first intake bypass passage and adapted to adjust a first intake bypass area, which is the minimum opening sectional area of the first intake bypass passage;

a second exhaust control valve disposed in the second exhaust bypass passage and adapted to adjust a second exhaust bypass area, which is the minimum opening sectional area of the second exhaust bypass passage;

a second intake control valve disposed in the second intake bypass passage and adapted to adjust a second intake bypass area, which is the minimum opening sectional area of the second intake bypass passage;

an electronic control unit programmed to:

acquire a supercharging pressure ratio, which is the ratio of the pressure in the intake passage at a position downstream of a merging point between the first and second intake passages to the pressure in the intake passage at a position upstream of the first and second compressors;

acquire the flow rate of air passing through the intake passage;

determine whether a combination of the supercharging pressure ratio and the air flow rate falls within a two turbos use region in which supercharging effects of both the first and second turbo chargers are utilized, or a second turbo use region which is adjacently located on one side of the two turbos use region where the air flow rate assumes a larger value as compared with the other side thereof and in which a supercharging effect of only the second turbo charger is utilized;

control the first and second exhaust control valves and the first and second intake control valves such that the first exhaust bypass area assumes an intermediate value between its minimum and maximum values, the first intake bypass area assumes its minimum value, the second exhaust bypass area assumes an intermediate value between its minimum and maximum values, and the second intake bypass area assumes its minimum value, when the combination of the supercharging pressure ratio and the air flow rate is determined to fall within the two turbos use region, and for controlling the first and second exhaust control valves and the first and second intake control valves such that the first exhaust bypass area assumes its maximum value, the first intake bypass area assumes its maximum value, the second exhaust bypass area assumes its minimum value, and the second intake bypass area assumes its minimum value, when the combination of the supercharging pressure ratio and the air flow rate is determined to fall within the second turbo use region; and inject fuel in an amount based on an operation state of the internal combustion engine, wherein:

the electronic control unit is configured to perform, over a predetermined period, amount reducing control for reducing the injection amount of the fuel, when the combination of the supercharging pressure ratio and the air flow rate shifts from the two turbos use region to the second turbo use region, and the electronic control unit is configured such that: (i) when the amount reducing control is not performed, the electronic control unit injects fuel in a base fuel injection amount determined based on a pressure (Pim) in an intake manifold and a rotational speed (NE) of the internal combustion engine, and (ii) when the amount reducing control is performed, the electronic control unit injects fuel in an amount smaller than the base fuel injection amount.

8. An apparatus for a supercharger-equipped internal combustion engine according to claim 7, wherein
the electronic control unit is configured to determine an amount by which the injection amount of the fuel is reduced in the amount reducing control, on the basis of an operation speed of the internal combustion engine and the injection amount of the fuel.

9. An apparatus for a supercharger-equipped internal combustion engine according to claim 7, wherein
the electronic control unit is configured such that, when the combination of the supercharging pressure ratio and the air flow rate shifts from the two turbos use region to the second turbo use region, the electronic control unit determines whether or not the amount reducing control is to be performed, on the basis of an operation speed of the internal combustion engine and the injection amount of the fuel.

10. An apparatus for a supercharger-equipped internal combustion engine according to claim 7, wherein
the electronic control unit is configured to start the amount reducing control when the combination of the supercharging pressure ratio and the air flow rate has shifted from the two turbos use region to the second turbo use region, and then end the amount reducing control when the pressure of intake gas flowing into a combustion chamber of the internal combustion engine is determined to have started to decrease.

11. An apparatus for a supercharger-equipped internal combustion engine according to claim 7, wherein
the electronic control unit is configured to determine whether or not the combination of the supercharging pressure ratio and the air flow rate falls within a first turbo use region which is adjacently located on one side of the two turbos use region where the air flow rate assumes a smaller value as compared with the opposite side, and in which a supercharging effect of the first turbo charger is utilized; and
the electronic control unit is configured to control the first and second exhaust control valves and the first and second intake control valves such that the first exhaust bypass area assumes its minimum value, the first intake bypass area assumes its minimum value, the second exhaust bypass area assumes its maximum value, and the second intake bypass area assumes its maximum value, when the combination of the supercharging pressure ratio and the air flow rate is determined to fall within the first turbo use region.

12. An apparatus for a supercharger-equipped internal combustion engine according to claim 7, wherein
the electronic control unit is configured to control the second exhaust control valve such that the second exhaust bypass area assumes its maximum value, rather than its minimum value, when the combination of the supercharging pressure ratio and the air flow rate falls within a bypass region, which is a portion of the second turbo use region in which the air flow rate assumes a larger value as compared with the remaining portion of the second turbo use region.

\* \* \* \* \*